United States Patent [19]

Hollins

[11] 3,849,987
[45] Nov. 26, 1974

[54] DUAL CONTROL HYDRAULIC BRAKE SYSTEM FOR MOTOR VEHICLES

[76] Inventor: Jesse R. Hollins, 40 Stoner Ave., Great Neck, N.Y. 11021

[22] Filed: Aug. 31, 1973

[21] Appl. No.: 393,632

[52] U.S. Cl. .............................................. 60/547
[51] Int. Cl. ........................................... F15b 7/00
[58] Field of Search ............ 60/547, 548, 552, 553

[56] References Cited
UNITED STATES PATENTS

| | | | |
|---|---|---|---|
| 2,929,216 | 3/1960 | Stelzer | 60/553 |
| 3,050,944 | 8/1962 | Schwartz et al. | 60/553 |
| 3,074,383 | 1/1963 | Schultz | 60/548 |
| 3,564,849 | 2/1971 | Huruta et al. | 60/553 |
| 3,625,005 | 12/1971 | Saunders et al. | 60/552 |
| 3,766,736 | 10/1973 | Nordeen | 60/553 |

Primary Examiner—Martin P. Schwadron
Assistant Examiner—H. Burks, Sr.

[57] ABSTRACT

A dual control hydraulic brake system for motor vehicles which includes a hydraulic master cylinder. A power operated means is provided for controlling the movement of said master cylinder piston rod in response to a brake pedal being depressed. If the power operated means is inoperative, means is provided so that when said brake pedal is depressed said hydraulic master cylinder piston rod is moved applying the vehicle brakes.

10 Claims, 4 Drawing Figures

3,849,987

DUAL CONTROL HYDRAULIC BRAKE SYSTEM FOR MOTOR VEHICLES

BACKGROUND OF THE INVENTION

1. Field of the Invention

Dual control hydraulic brake system for motor vehicles

2. Description of the Prior Art

Many vehicles are equipped with a vacuum-operated booster in conjunction with the master cylinder unit for ease of operation of the hydraulic brake system. As will be apparent to those skilled in the art, the source of vacuum is the engine intake manifold. The use of a vacuum booster has proved satisfactory except that there is no means by which the hydraulic brake system can be satisfactorily manually operated to operate the vehicle brakes repetitively in the event that the engine ceases operating and there is no longer vacuum available. Quite frequently, it is necessary that the brake system be functional even though the engine is not running. As an example, if a vehicle having power steering stalls while in motion, it is necessary to bring the car to a halt immediately since without the aid of the power steering system it is extremely difficult to steer the vehicle.

With increasing attention being directed to reducing the exhaust emissions of motor vehicle internal combustion engines, it is possible that future engines will have fuel air injection systems so that the conventional well known vacuum system will operate at a greatly reduced vacuum or with possibly no vacuum at all.

SUMMARY OF THE INVENTION

1. Purposes of the Invention

It is an object of the present invention to provide an improved dual control hydraulic brake system for motor vehicles.

Another object of the present invention is to provide a dual control hydraulic brake system for motor vehicles wherein said system includes an engine operated power means for operating the hydraulic brake system and is designed so that the hydraulic brake system can be manually operated when the engine is not running.

Other objects of the invention in part will be obvious and in part will hereinafter be pointed out.

2. Brief Description of the Invention

According to one aspect of the present invention, the foregoing as well as other objects are accomplished by having an auxillary piston and cylinder unit for moving the master cylinder piston rod and associated pistons of a hydraulic brake system. The auxillary piston and cylinder unit includes a piston having a rod attached thereto. A spring biases said piston to a first position which corresponds to the brakes off position.

A yoke is provided which is movable with said auxillary piston rod. Said yoke includes a first end which surrounds the master cylinder piston rod and is movable relative thereto. Said yoke first end is flanked by a first collar which is affixed to said master cylinder piston rod adjacent said brake pedal. A second collar is provided which is affixed to said master cylinder piston rod and together with said first collar flanks said yoke first end.

The output line of the motor vehicle power steering pump is connected to a cam controlled pressure regulator. Said cam controlled pressure regulator is connected to a valve which is progressively opened by said brake pedal being progressively depressed. The valve controls the flow of fluid to the auxillary cylinder.

A cam is connected to the brake pedal and controls the operation of the cam controlled pressure regulator.

In operation, the brake pedal is depressed causing the valve to permit pressurized fluid to flow from the power steering pump outline line to the auxillary cylinder. As a consequence, the piston in the auxillary cylinder moves away from the first position and the yoke abuts the second collar causing the master cylinder piston rod and associated pistons to move thereby causing hydraulic fluid to be directed to the front and rear wheel brake cylinders. Continued movement of the brake pedal causes the cam, which is movable therewith, to act on the cam controlled pressure regulator allowing fluid at an increased pressure to be directed to the valve so that there will be increased pressure on the piston within the auxillary cylinder causing the master cylinder pistons to direct increased amounts of fluid to the wheel brake cylinders to increase the speed with which the brakes are applied. When it is no longer necessary to apply the brakes manual pressure is released from the brake pedal. The brake spring moves the brake pedal to the brakes off position. As a consequence, the valve is moved so that the auxillary cylinder is connected for bleeding to the power steering pump hydraulic reservoir. Accordingly, the brakes are no longer applied.

If the engine should cease operating, the power steering pump is no longer operative to actuate the piston in the auxillary cylinder. However, if applying the brakes is necessary, manual depression of the brake pedal results in abutment with said first collar causing said master cylinder piston rod and associated pistons to move directing hydraulic fluid to the wheel brake cylinders. There is no limit as to the number of times the brakes can be applied manually, as now exists in the vacuum booster brake system.

The invention accordingly consists in the features of construction, combination of elements and arrangement of parts which will be exemplified in the dual control hydraulic brake system for motor vehicles hereinafter described and of which the scope of application will be indicated in the appended claims.

DESCRIPTION OF THE PREFERRED EMBODIMENT

Figure 1:
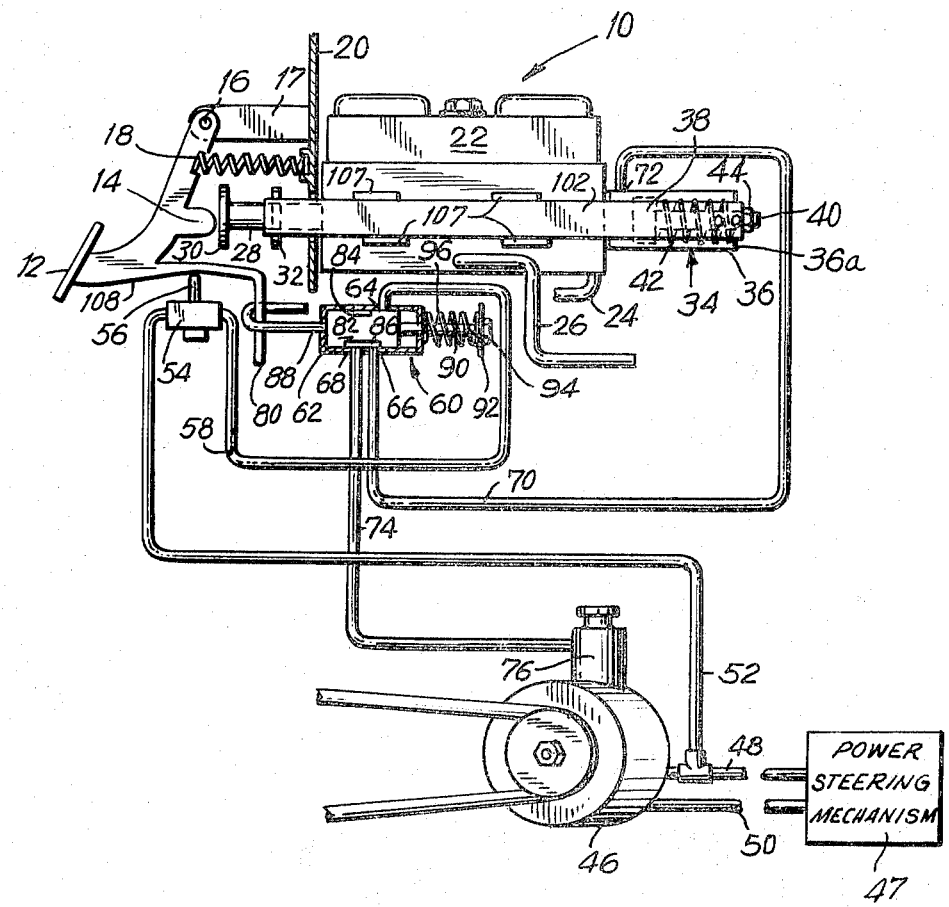
FIG. 1 is a schematic illustration of an embodiment of the present invention.

In FIG. 1 of the drawings a dual control hydraulic brake system 10 for a motor vehicle is schematically shown and includes a brake pedal 12 having a master cylinder piston rod actuator 14. Brake pedal 12 is pivotable about a pivot 16 which is affixed to a bracket 17. A brake compression spring 18 is connected to brake pedal 12 and to fire wall 20 and biases brake pedal 12 to a brakes off position. Secured to fire wall 20 is a hydraulic master cylinder 22 having conventional internal structure which is not shown. Master cylinder 22 is connected to a line 24 which leads to the rear wheel brake cylinders and a line 26 which leads to the front wheel brake cylinders. A master cylinder piston rod 28 is provided for controlling the flow of fluid from master cylinder 22. Master cylinder piston rod 28 has secured at its free end a collar 30. Secured to master cylinder piston rod 28 but spaced from collar 30 is a further collar 32.

An auxillary power unit 34 includes a cylinder 36 and a piston 38 housed therein. Secured to piston 38 is a rod 40 which extends through an opening in end 36a of cylinder 36. A compression spring 42 surrounds rod 40 and abuts the inside surface of end 36a and abuts piston 38. Secured to a threaded portion or rod 40 outside cylinder 36 is a nut 44.

A conventional power steering pump 46 provides fluid power to a power steering mechanism 47 which is schematically shown and is conventional. An output line 48 leads to the power steering mechanism 47 from the power steering pump 46 and a return line 50 which is connected to the power steering pump reservoir. A conduit 52 is connected to output line 48 and to cam controlled pressure regulator 54. Cam controlled pressure regulator 54 includes a control rod 56. A conduit 58 connects cam control pressure regulator 54 to a three-way servo valve 60. Servo valve 60 includes a stationary valve sleeve 62 having ports 64, 66 and 68. Conduit 58 is connected to port 64. A conduit 70 connects port 66 to a port 72 which communicates with the interior of cylinder 36. A conduit 74 communicates port 68 with power steering pump reservoir 76.

An L-shaped valve control finger 80 is secured to brake pedal 12. Located in valve sleeve 62 is a valve spool 82 which includes an annular notch 84 and a cutaway 86. A rod 88 is secured to the left end of valve spool 82, extends through sleeve 62 and has a loop through which finger 80 extends. Secured to the right face of valve spool 82 is a rod 90 which extends through valve sleeve 62 and through a plate 92. Secured to the right end of rod 90 to the right of plate 92 is a stop nut 94. A compression spring 96 surrounds shaft 90 and one end of said compression spring abuts the right end of valve sleeve 62 and the other end of said compression spring abuts plate 92.

Figure 2:
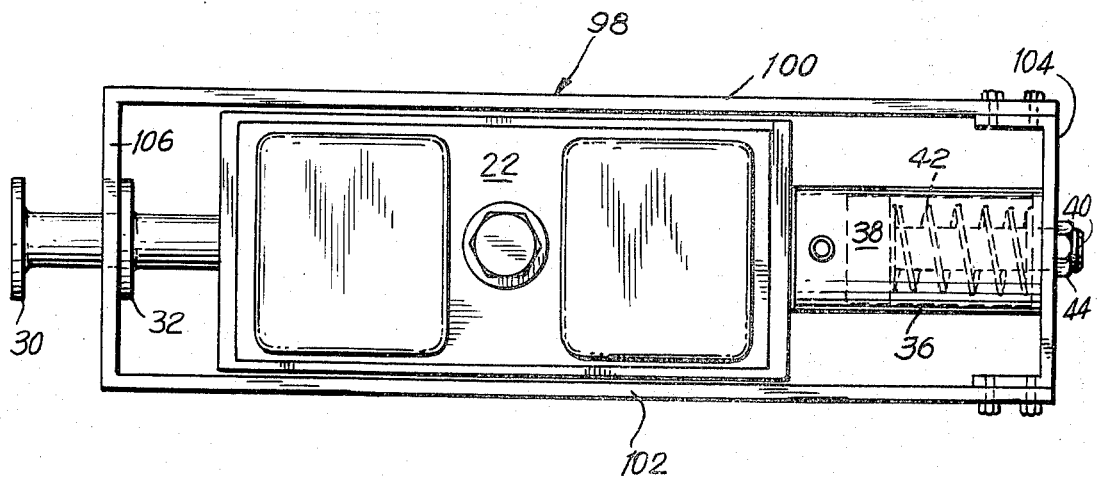
FIG. 2 is a top plan view of the yoke and master cylinder arrangement of the present invention shown in FIG. 1.

A yoke (FIG. 2) 98 is provided and includes arms 100 and 102. A cross piece 104 is secured to the ends of arms 100 and 102 and includes a tapped opening through which rod 40 extends in threaded engagement. A nut 44 locks cross piece 104. Yoke 98 moves longitudinally in unison with rod 40 and with piston 38. The forward cross member 106 of yoke 98 is positioned between collars 30 and 32, surrounds master cylinder piston rod 28 and is movable relative to master cylinder piston rod 28. If desired, yoke guides may be incorporated to assure smooth operation of the yoke and said guides are identified by the reference numeral 107.

Integral with brake pedal 12 is a cam 108 for acting upon control rod 56 in a manner that will hereinafter be described.

If the motor vehicle is moving and it is desired to apply the brakes, a manual force is applied to brake pedal 12 rotating the same in a counter clockwise direction about pivot 16 and against the bias of spring 18. As a result, finger 80 moves to the right leaving a slight gap between the loop in rod 88 and said finger. Spring 96 expands moving spool 82 to the right so that ports 64 and 66 are in communication with each other via annular notch 84. As brake pedal 12 is so moved, cam 108 depresses control rod 56 causing cam controlled pressure regulator 54 to allow increased amounts of fluid pressure to be transferred from conduit 52 to conduit 58. It is to be noted that with the engine running power steering pump 46 will be supplying pressurized fluid to conduits 48 and 52 to that the power steering mechanism 47 will be operating. With valve spool 82 positioned so that ports 64 and 66 are in communication with each other, pressurized fluid from power steering pump 46 is directed to conduit 70 and port 72. Consequently, piston 38 is moved to the right overcoming the bias of spring 42. Yoke 98 is moved to the right abutting collar 32 and moving master cylinder piston rod 28 and its associated pistons forward so that the fluid under pressure is directed to lines 24 and 26 and to the wheel brake cylinders. Continued forward movement of brake pedal 12 results in increased amounts of depression of control rod 56 so that an increased amount of fluid under higher pressure is transferred from conduit 52 to conduit 58.

When manual pressure is released from brake pedal 12, brake spring 18 returns said brake pedal to the brakes off position. Finger 80 moves valve spool 82 against the bias of spring 96 to a position such that ports 66 and 68 are in communication with each other via cutaway 86 and conduit 70 is connected via conduit 74 to power steering pump reservoir 76. Spring 42 expands moving the yoke rearwardly and the springs of the brake band assemblies cause the hydraulic fluid from each wheel cylinder to return to the master cylinder causing the master cylinder piston rod and its associated pistons to retract.

If it is desired to apply the brakes when the engine is not running and the power steering pump 46 is inoperative, manual pressure on the brake pedal 12 results in master cylinder piston rod actuator 14 abutting collar 30 moving master cylinder piston rod 28 and its associated pistons forward so that hydraulic fluid is forced through lines 24 and 26 so that the brakes are applied. When it is no longer necessary to have the brakes applied manual pressure is released from pedal 12 and spring 18 moves brake pedal 12 to the brakes off position and master cylinder piston rod 28 and its associated pistons move rearward thus allowing the return of fluid from the brake wheels cylinders to the master cylinder.

It is to be appreciated that a sufficient distance exists between brake pedal 12 and collar 30 so that when the engine is operating depression of the brake pedal does not result in abutment with collar 30 but instead results in finger 80 moving to the right so that yoke 98 moves master cylinder piston rod 28 and its associated pistons forward.

It is to be appreciated that power steering mechanism 47 is a flow through device, that is to say, said power steering mechanism continuously receives pressurized fluid from power steering pump 46. On the other hand, only a very limited quantity of pressurized fluid from power steering pump 46 is required to operate the dual control hydraulic brake system of the present invention inasmuch as the only pressurized fluid that is required is to move piston 38 against the bias of spring 42 to the forward end of auxillary cylinder 34. Obviously, the small amount of pressurized fluid required to move piston 38 does not in any way affect the functioning of power steering mechanism 47.

Figure 3:
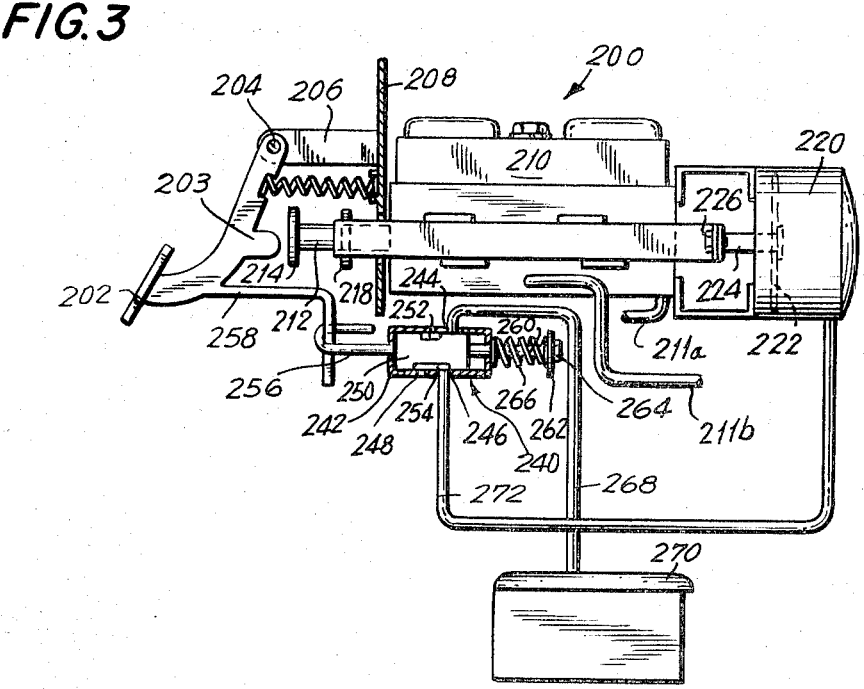
FIG. 3 is a schematic illustration of a further embodiment of the present invention.
Figure 4:
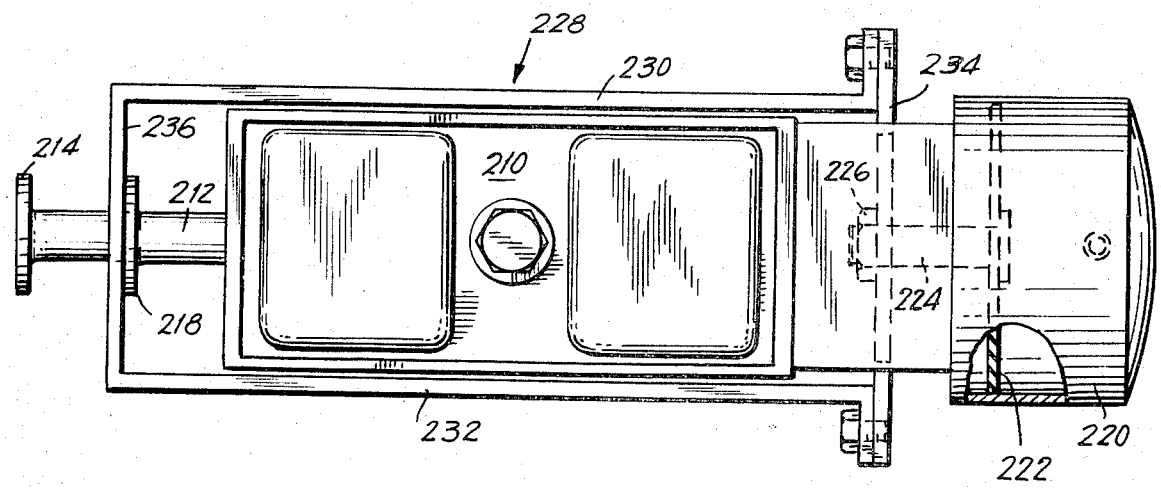
FIG. 4 is a top plan view of the yoke and master cylinder arrangement shown in FIG. 3.

In FIGS. 3 and 4 of the drawings a further embodiment 200 of the present invention is illustrated and includes a brake pedal 202 which is pivoted about a pivot 204 which is affixed to a bracket 206. Bracket 206 is affixed to fire wall 208. Brake pedal 202 includes a master cylinder piston rod actuator 203. A conventional hydraulic master cylinder 210 is provided and includes a master cylinder piston rod 212 which extends through fire wall 208. Two pistons in master cylinder 210 are associated with piston rod 212. Conduits 211a and 211b lead from the master cylinder to the rear and front brake wheel cylinders respectively. Affixed to hydraulic master cylinder piston rod 212 at the free end thereof is a first collar 214 and affixed to said rod but spaced from first collar 215 is a second collar 218.

A vacuum operated booster unit 220 is provided which is conventional and includes a diaphragm 222. Movable with diaphragm 222 is a rod 224 with the free end of said rod being threaded. A nut 226 is secured to the threaded end of rod 224. A yoke 228 is provided and includes arms 230 and 232. A cross piece 234 is secured to the ends of yoke 230 and 232 on the engine side of fire wall 208 and cross piece 234 is secured to rod 224 by nut 226 so as to be movable with said rod when said rod moves to the right as shown in FIGS. 3 and 4 during brake application. The forward end 236 of yoke 228 surrounds master cylinder piston rod 212, is movable relative thereto and is positioned between collars 214 and 218.

A three-way servo valve 240 is provided and includes a stationary sleeve 242 having ports 244, 246 and 248. Movable in sleeve 240 is a valve spool 250 which includes an annular notch 252 and cutaway 254.

Secured to the left face of valve spool 250 and extending through the left end of valve sleeve 242 is a rod 252 which includes a loop. An L-shaped finger 258 is secured to brake pedal 208 and the vertical portion thereof extends through the loop formed by rod 256. A rod 260 is secured to the right face of valve spool 250, extends through the right end of valve sleeve 242, through a plate 262 and the free end of said rod is threaded with a nut 264 secured thereto. A compression spring 266 surrounds rod 260 and one end of said compression spring abuts plate 262 and the other end of said compression spring abuts the right end of valve sleeve 242.

A conduit 268 is connected to intake manifold 270 and to port 244. A conduit 272 connects port 246 to vacuum booster 220. Port 248 is connected to ambient.

In operation, when the vehicle brakes are not applied, finger 258 maintains spool 250 in the position shown in FIG. 3 so that ports 246 and 248 communicate with each other via cutaway 254 and atmospheric pressure is transmitted to vacuum operated booster unit 220. When it is desired to apply the brakes, with the engine operating, pedal 202 is depressed and is rotated in a counter clockwise direction about pivot 204. As a result, finger 258 moves to the right and spring 266 expands so that spool 250 is moved to a position such that ports 244 and 246 are in communication with each other via annular notch 252. Since the engine is operating, a vacuum is applied to vacuum operated booster unit 220 so that diaphragm 224 is pulled to the right. Yoke 228 is pulled to the right and the forward end thereof abuts collar 218 moving master cylinder piston rod 212 to the right so that fluid is directed from the master cylinder and the brakes are applied. When pressure is released from the brake pedal, spring 203 swings brake pedal 202 in a clockwise direction and finger 258 pulls rod 256 to the left against the bias of spring 260 so that ports 246 and 248 are again in communication with each other. Since a vacuum is no longer applied to vacuum operated booster unit 220, diaphragm 224 is pulled to the left as the master cylinder piston rod moves to the left as a result of the pistons in the master cylinder being supplied with braking fluid under pressure from the brake wheel cylinders.

If the engine should cease operating, the brakes can still be applied by depressing pedal 202. Such depression results in master cylinder piston rod actuator 203 abutting collar 214 moving master cylinder piston rod and its associated pistons to the right so that the brakes are applied. It is to be appreciated that there is sufficient space between actuator 203 and collar 214 in the brakes off position of brake pedal 202 so that when said brake pedal is depressed with the engine operating finger 258 will move a sufficient distance to allow the brake system to become operative prior to actuator 203 abutting collar 214.

It thus will be seen that there is provided a dual control hydraulic brake system for motor vehicles which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention what is claimed as new and desired to be secured by Letters Patent is:

1. A dual control hydraulic brake system for an engine driven motor vehicle comprising a hydraulic master cylinder, said hydraulic master cylinder including a master cylinder control element which upon being moved causes the motor vehicle brakes to be applied, a brake pedal, a pump having a pressurized fluid discharge line and a reservoir line, a hydraulic motor spaced from and in fluid isolation from said hydraulic master cylinder, a control valve for controlling communication between said hydraulic motor and said pump pressurized fluid discharge line and said pump reservoir line, means for controlling operation of said control valve as said brake pedal is depressed, a yoke linking said master cylinder control element to said hydraulic motor, and means for moving said master cylinder control element in unison with said yoke when said pump is operative and fluid from said pump is directed to said hydraulic motor causing the motor vehicle brakes to be applied and for allowing said master cylinder control element to move independently of said yoke upon failure of said pump to operate when said brake pedal is depressed.

2. A dual control hydraulic brake system according to claim 1 wherein said pump is a power steering pump.

3. A dual control hydraulic brake system according to claim 1 wherein means is provided for regulating the flow from said pressurized fluid discharge line to said control valve as a function of the position of said brake pedal.

4. A dual control hydraulic brake system according to claim 1 wherein said hydraulic motor consists of a piston element and a cylinder element and said yoke is external of said cylinder element.

5. A dual control hydraulic brake system for an engine driven motor vehicle comprising a hydraulic master cylinder, said hydraulic master cylinder including a master cylinder control member which upon being moved causes the vehicle brakes to be applied, a brake pedal, a hydraulic motor, said hydraulic motor including a cylinder element and a piston element, a source of engine driven power means, means connecting said source to said cylinder element as a function of the depression of said brake pedal, means connected to one of said elements, external of said cylinder element and mechanically coupled to said master cylinder control member for controlling the position of said master cylinder control member as said brake pedal is depressed when said power source is operative and means fixed to said master cylinder control member for enabling said master cylinder control member to be moved as said brake pedal is depressed independently of said coupling means to apply the vehicle brakes when the power source is inoperative.

6. A dual control hydraulic brake system according to claim 5 wherein said hydraulic motor is in fluid isolation with respect to said hydraulic master cylinder and spaced therefrom.

7. A dual control hydraulic brake system according to claim 5 wherein said source is an engine driven pump.

8. A dual control hydraulic brake system according to claim 5 wherein said source is the engine intake manifold.

9. A dual control hydraulic brake system according to claim 5 wherein said mechanical coupling means includes a yoke connected to one of said elements and coupled to said hydraulic master cylinder control member.

10. A dual control hydraulic brake system according to claim 6 wherein said hydraulic motor is located in front of said hydraulic master cylinder.

* * * * *